No. 77,307.  
C. E. MOORE.  
FLUID METER.  
PATENTED APR. 28, 1868.
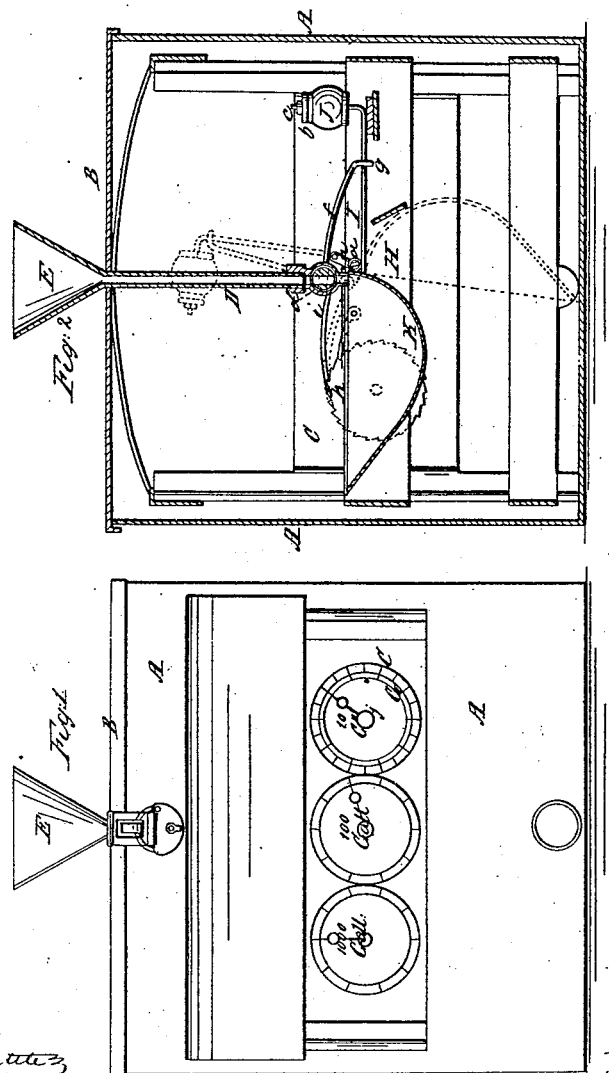

United States Patent Office.

CHARLES E. MOORE, OF ELIZABETHPORT, NEW JERSEY.

Letters Patent No. 77,807, dated April 28, 1868.

IMPROVEMENT IN FLUID-METERS.

The Schedule referred to in these Letters Patent and making part of the same.

TO ALL WHOM IT MAY CONCERN:

Be it known that I, CHARLES E. MOORE, of Elizabethport, in the county of Union, and State of New Jersey, have invented a new and useful Improvement in Fluid-Meters; and I do hereby declare that the following is a full, clear, and exact description thereof, which will enable others skilled in the art to make and use the same, reference being had to the accompanying drawing, forming part of this specification, in which—

Figure 1 is a front view of chamber and dial of the register.

Figure 2 is a transverse vertical section of the interior mechanism of the meter.

Similar letters of reference indicate like parts.

The object of this invention is to weigh and measure any fluid automatically, by means of the gravity of the same, as will hereinafter be fully set forth.

In the accompanying plate of drawings, the case or chamber containing the mechanism is shown at A, and is a cubical box, of sheet metal, into which the meter proper slides with easy contact. This chamber is provided with a lid, B, and padlock or other lock, as shown.

It is further provided with a side door, which is, in practice, provided with a lock, to secure the dials from inspection by any but the person properly authorized to do so.

The dials are marked or otherwise affixed to the plate C', attached to or forming part of the frame of the mechanism, as shown, and their connection with the meter-pan will hereinafter be set forth.

The pipe D, bearing a funnel, E, discharges into the meter-pan K, which latter swings downward upon any suitable hinge-device, as shown at $a$, which are gudgeons, having bearings in the side-plates H, forming part of the frame of the meter.

From the bar of the meter extends an arm, I, bearing at its end a weight, J, sufficient to nearly balance the quantity of fluid which the pan will hold.

Additional weights $b$ are to be set on with a nut, $c$, when the particular specific gravity of the fluid is to be determined.

A cock, $d$, in the lower end of the pipe, serves to shut off the fluid from the pan, when the latter swings down to discharge the fluid therein contained, and to accomplish this automatically, the cock is connected with the arm I by a lever, F, which is formed with an eye, $g$, which latter slides along in the arm I, when the latter rises or lowers with the movement of the meter-pan.

One of the gudgeons, $a$, bears an arm, $h$, to which is pivoted a ratchet-pawl, $i$, and this pawl moves forward a ratchet-wheel, $k$, at every downward movement of the meter-pan. The shaft of this ratchet-wheel bears a pointer, $j$, which, as it revolves, enters upon a graduated dial, G, the number of times the meter-pan has been filled. The pointers of the other dials are shown in red, and their shafts are, in practice, connected with the shaft of the ratchet-wheel by any suitable train of wheel-work, so that one thousand or more gallons may be registered.

The operation of this meter is as follows: The funnel is placed under the stream of fluid, and the same passes downward into the meter-pan, and fills it, the certain point at which the weight of the fluid will counterbalance the weights on the arm I, when the pan will swing down, as shown in red outlines, and discharge the fluid upon the bottom of the chamber, and in so swinging down, the cock $d$ is closed by the action of its arm, as before described, thus shutting off the flow of fluid until the pan rises again to its horizontal position.

This invention is more particularly designed to meet the wants of the Internal Revenue Department of the United States, which department have advertised for automatic spirit-meters which will both weigh and measure spirits, and register the same.

Having thus described my invention, I claim as new, and desire to secure by Letters Patent—

The combination of the hinged meter-pan K, arm I, weight J, cock $d$, pawl $i$, ratchet-wheel $k$, and any suitable registering-dials, all constructed and operated substantially as shown and described, and for the purpose set forth.

The above specification of my invention signed by me, this 5th day of March, 1868.

CHAS. E. MOORE.

Witnesses:
WM. F. MCNAMARA,
ALEX. F. ROBERTS.